United States Patent [19]

Flaum

[11] Patent Number: 5,019,708

[45] Date of Patent: May 28, 1991

[54] METHOD FOR ELIMINATING THE EFFECT OF RUGOSITY FROM COMPENSATED FORMATION LOGS BY GEOMETRICAL RESPONSE MATCHING

[75] Inventor: Charles Flaum, Houston, Tex.

[73] Assignee: Schlumberger Technology Corporation, Houston, Tex.

[21] Appl. No.: 417,382

[22] Filed: Oct. 5, 1989

[51] Int. Cl.$^5$ .................... G01V 5/04; G01V 5/12
[52] U.S. Cl. ...................... 250/264; 250/265; 250/266; 250/269
[58] Field of Search ............... 250/264, 265, 266, 269

[56] References Cited

U.S. PATENT DOCUMENTS

| | | | |
|---|---|---|---|
| 4,394,674 | 7/1983 | Grau et al. | 250/262 |
| 4,423,323 | 12/1983 | Ellis et al. | 250/264 |
| 4,604,522 | 8/1986 | Arnold | 250/264 |
| 4,786,796 | 11/1988 | Flaum et al. | 250/266 |
| 4,794,792 | 1/1989 | Flaum et al. | 73/152 |
| 4,814,611 | 3/1989 | Moake | 250/269 |
| 4,909,075 | 3/1990 | Flaum et al. | 73/152 |

*Primary Examiner*—Constantine Hannaher
*Assistant Examiner*—Edward J. Glick
*Attorney, Agent, or Firm*—Henry N. Garrana; Frederic C. Wagret

[57] ABSTRACT

A method for determining the compensated density of a subsurface geological formation wherein the effect of borehole rugosity is reduced or eliminated utilizes the differences in the vertical response functions of the detectors at different distances into the formation. The method eliminates the contribution of the "shallow" formation region, irrespective of whether its properties are varying slowly or rapidly, without degrading the resulting vertical resolution. Furthermore, the method for determining such a characteristic of a subsurface geological formation does not require any additional or new measurements to be made, thus logging data from older wells can easily be reevaluated.

30 Claims, 3 Drawing Sheets

METHOD FOR ELIMINATING THE EFFECT OF RUGOSITY FROM COMPENSATED FORMATION LOGS BY GEOMETRICAL RESPONSE MATCHING

FIELD OF THE INVENTION

The invention relates to a method for determining the compensated density or other characteristic of a subsurface geological formation traversed by a borehole, wherein the effect of rugosity is reduced or eliminated.

DESCRIPTION OF THE PRIOR ART

Many characteristics of subsurface geological formations are determined through use of various types of logging tools which employ multiple detectors, or signal sensors, and a signal source. These logging tools determine characteristics such as density, porosity and resistivity and include induction and sonic tools. In many of these tools, e.g., density, porosity, resistivity, induction, or sonic, the detectors, or signal sensors, are spaced from the signal source by different distances. The signal source transmits a signal into the subsurface geological formation, which signal is received by the signal sensors, or detectors. The use of multiple detectors allows for the elimination of the contribution of the region close to the borehole wall from the derived response. This is needed because this "shallow" region is often detrimentally affected by the drilling process, and exhibits properties different from those of the undisturbed or "deep" region. The inventive process described herein may be used with any of the above-described logging tools for determining the respective formation characteristics. However, for the sake of brevity, the density tool is used as the illustrative example for determining formation density using the inventive process.

For example, compensated density measurements in a subsurface geological formation are generally performed by a logging tool which utilizes two detectors, such as the dual-detector gamma radiation bulk density tool, which is well known in the art. The compensated density may be determined from the count rates of two detectors located at two different spacings from a common gamma radiation source. The dual-detector gamma radiation bulk density tool has a near detector which is more sensitive to the "shallow" region than the far detector. The near detector response is used to eliminate the contribution of this "shallow" region from the far detector response in order to derive the density of the formation in the "deep" region unperturbed by the drilling process. The procedure commonly applied in the art is usually referred to as the "spine-and-ribs" method.

Generally, two types of perturbations of the "shallow" region are encountered in boreholes. The first is the formation of mudcake, which forms a coating over the borehole wall, and through which many of the logging tools must "look" at the formation. The second type is borehole rugosity, where the borehole wall becomes rough due to damage from the drilling process.

Historically, the spine-ribs technique for obtaining borehole and mudcake compensation of dual detector gamma-gamma density logs has been shown to be very successful as long as the borehole and other environmental effects are slowly varying with depth, and as long as the interest is limited to vertical features broader than several feet. The effects of rugosity, however, can vary very rapidly, and may seriously corrupt the density determination, especially when good vertical resolution is required.

For the purpose of this invention rugosity is defined as a rapid discontinuity in the borehole wall, with depth limited to the maximum thickness of mudcake for which "spine-and-ribs" compensation gives valid results. This is typically limited to about three quarters of an inch. For rugosities significantly deeper than this, no accurate density measurement can be made with a gamma-gamma type device.

The recent introduction of the enhanced vertical resolution processing of density logs known as alpha processing has stimulated renewed interest in examination of sensor signals in greater vertical detail, and in improving our understanding of the geometrical response functions of these sensors. Experience with alpha processing has also emphasized the importance of vertical resolution matching of the detector signals before any systematic compensation schemes can be applied.

One of the limitations of alpha processing is that the method, by assumption, becomes invalid in the presence of substantial rugosity. This follows from the technique's use of the high frequency information from the near detector, which is highly sensitive to rugosity. Furthermore, the assumption had been made that unique vertical response functions could be found to effect this vertical resolution matching. The response functions used were dominated by the detector response in the "deep" region of the formation, as they were derived from situations in which shallow perturbation effects were absent or constant.

Recent experience, however, has indicated that the vertical response functions of the density detectors change with the distance away from the tool, or into the formation. Specifically, the vertical response to the "shallow" region is very different from the vertical response to the "deep" region.

Accordingly, prior to the development of the present invention, there has been no method for determining the density of a subsurface geological formation utilizing a dual-detector logging tool, which method utilizes the differences in the vertical response functions of the detectors at different depths away from the borehole, to reduce or eliminate the effect of rugosity from the derived response. All previous methods assume that the "shallow" region properties are slowly varying with depth. In cases where this is not true, heavy smoothing has been required to reduce the perturbing effect, at the cost of degradation in vertical resolution.

Therefore, the art has sought a method for determining the compensated density of a subsurface geological formation wherein the effect of borehole rugosity is reduced or eliminated by utilizing the differences in the vertical response functions of the detectors at different distances into the formation. The method can eliminate the contribution of the "shallow" formation region, irrespective of whether its properties are varying slowly or rapidly, without degrading the resulting vertical resolution. Furthermore, the art has sought a method for determining such a characteristic of a subsurface geological formation which does not require any additional or new measurements to be made, whereby logging data from older wells can easily be reevaluated through such method.

The present invention for determining density includes the preferred method of: (a) passing a logging tool through the borehole, the logging tool having associated therewith a signal source and at least two signal sensors spaced from the signal source by different distances; (b) transmitting a signal from the signal source into the subsurface geological formation; (c) generating sensor signals from the at least two signal sensors in response to the signal from the signal source received by the at least two signal sensors; (d) linearizing the sensor signals; (e) applying specialized vertical filters to the linearized sensor signals from the previous step, with the purpose of matching the vertical responses of the two signals in the "shallow" formation region; and (f) determining a compensated density log, by combining the filtered sensor signals, wherein the contribution of the "shallow" formation region is reduced or eliminated. Another feature of the present invention is the step of generating a tangible representation of the determined density having enhanced characteristics.

Although the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
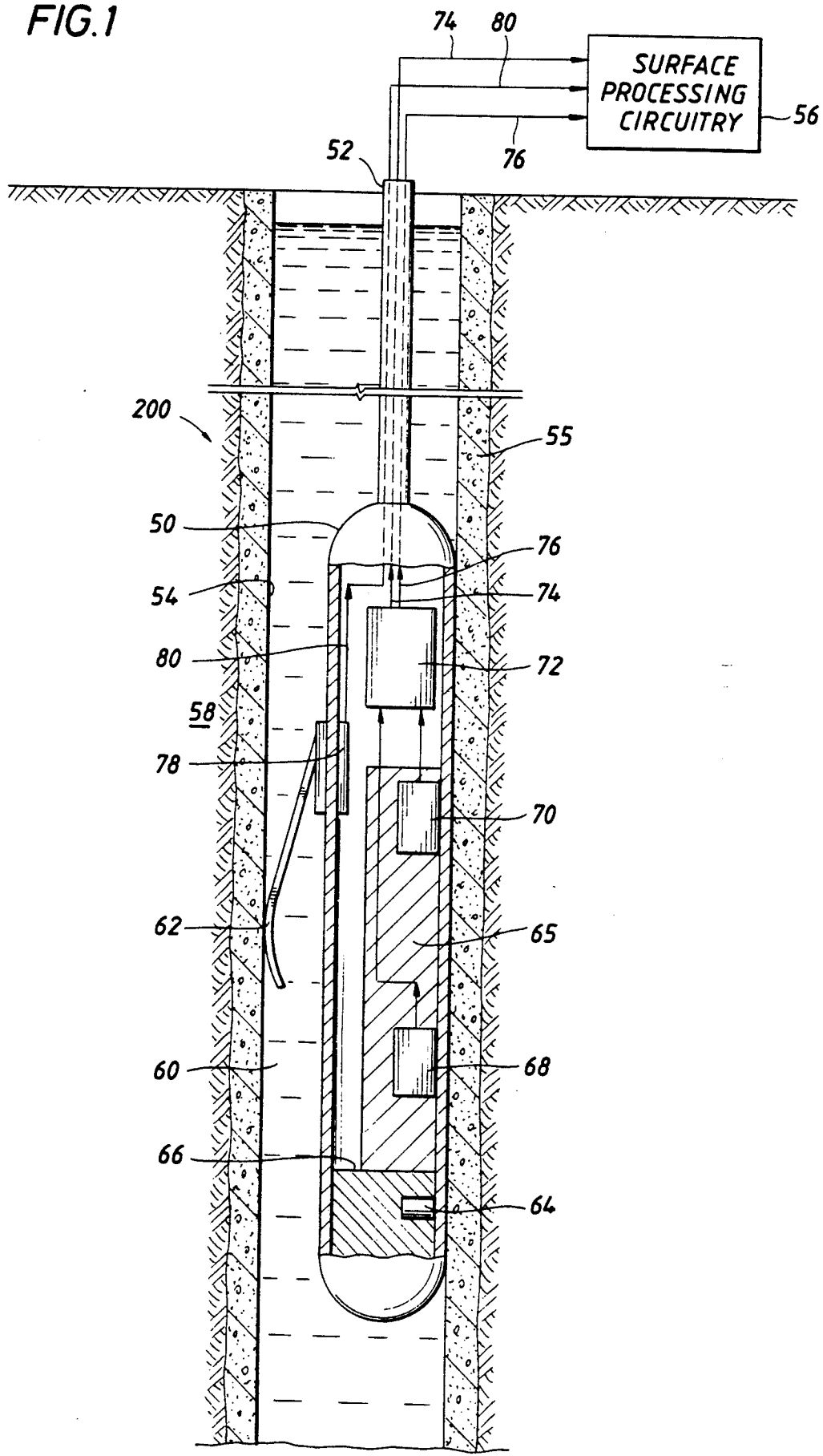
FIG. 1 is a schematic diagram of a dual-detector tool useful in practicing the methods of the present invention.

In FIG. 1, a representative dual-detector logging tool is illustrated. Logging tool 200 is preferably a gamma radiation bulk density tool, when the method of the present invention is utilized to determine the compensated density of a subsurface geological formation 58 traversed by a borehole 54, as is well known in the art. A fluid-tight pressure resistant housing 50 is suspended by an armored cable 52 in a borehole 54. Cable 52 comprises insulated conductors which electrically connect the equipment within the housing 50 with surface processing circuitry 56 at the earth's surface. A winch (not shown) is located at the surface and is used to lower and raise the housing 50 of logging tool 200 in the borehole 54 to traverse subsurface geological formations 58.

The borehole 54 may be dry or may be filled with drilling mud 60, as shown. It may also be coated with mud cake 55. To reduce the influence of the mud 60, a decentralizing mechanism, for example, a resiliently activated arm 62, may be pivotally attached to the housing 50 and urges its opposite side against the borehole wall, qr mud cake 55, to prevent the mud 60 from intervening between housing 50 and formation 58.

A gamma ray source, or signal source 64, is placed in the lowermost end of the housing 50 adjacent to the side that abuts the formation 58 or mudcake 55. The source, or signal source, 64 may be any conventional gamma ray source utilized in logging tools 200, such as a 1.5 curie Cs137 source. Because these sources 64 are isotropic, and emit gamma rays with equal probability in all directions, a heavy metal gamma ray shield 66 may be placed around most of the source 64, except, of course, the side adjacent to the borehole wall. Additional shielding 65 may be placed around and behind the detectors. Such shielding reduces the number of gamma rays which do not pass through the formation 58 in front of the tool, and thereby enhances the sensitivity and statistical precision of the measurements.

Signals (gamma rays) are transmitted, or emitted, from the gamma ray source, or signal source, 64 and diffuse through the formation 58, first passing through mudcake 55, if present. The gamma rays are then received by a short-spaced gamma ray detector, 68, and a long-spaced gamma ray detector 70, which are mounted within the housing above, and approximately in line with, the source 64. Typically, the near and far detectors, 68, 70 or signal sensors, each comprise a scintillator crystal coupled to a photomultiplier tube. The crystal, typically made of thallium activated sodium iodide (NaI) surrounded by a reflecting material, generates light pulses when a gamma ray strikes it and deposits some energy. The light is then scattered into the photomultiplier tube which converts it into an electrical signal whose amplitude is in proportion to the original energy deposited by the gamma ray.

It should be noted that the use of the terms "near-detector", "short-spaced" detector, or signal sensor "spaced the least distance from the signal source" are used to describe a detector conventionally used in a logging tool, such as logging tool 200, wherein the spacing of the detector, or signal sensor 68, from the signal source 64 is an optimum compromise between the ability of the detector to measure the desired characteristic of the formation 58, while providing the best vertical resolution of the desired signal from the signal sensor. In other words, if the detector 68 is spaced too close to the source 64, the desired measurement cannot be made. Further, the foregoing terms are not intended to encompass non-functional or non-operative detectors.

Pulses, or sensor signals, from the detectors 68 and 70 are passed to a downhole signal processor circuit 72 for transmission to the surface processing circuitry 56 through two conductors 74 and 76, respectively, in the armored cable 52, after discrimination against noise and amplification in a conventional manner. Pulses may also be digitized in an alternate version of circuit 72, and sent uphole as a digital signal. A borehole size indication may be obtained from caliper 78 combined with the decentralizing arm 62. The caliper 78 may transmit to the surface equipment 56, through a conductor 80 in the cable 52, signals that represent the borehole diameter in a conventional manner.

Figure 2:
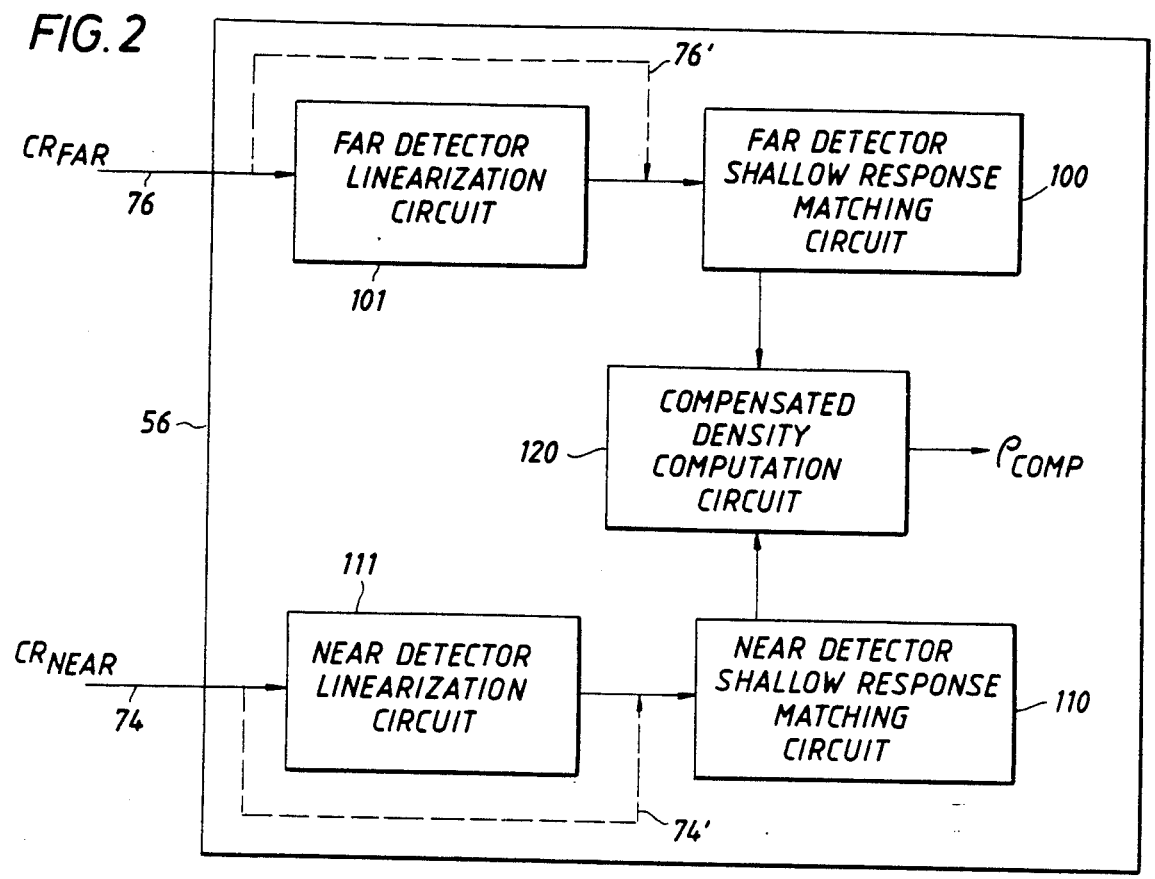
FIG. 2 is a schematic diagram of the circuit used to convert gamma radiation measurements to density values.

FIG. 2 shows the details of the surface signal processing circuitry 56. The far detector count rate signal is passed in to the Far Detector Shallow Response Matching Circuit 100 via conductor 76 and 76'. This circuit applies a specialized filter to the signal. This filter will be described later. Preferably, before applying the filter 100, the circuit may apply a linearizing function to the count rate such as by Far Detector Linearization Circuit 101 (rather than directly via conductor 76'), to allow improved application of linear convolution filters. For density detectors, this linearization function is typically the logarithm of the count rate. Similarly, the near detector count rate is passed through the Near Detector Shallow Response Matching Circuit 110 via conductor 74 and 74'. This circuit applies a specialized filter to the near detector signal, typically quite different from that in circuit 100. As in circuit 100, a linearization function, also typically logarithmic, is preferably applied to the count rate before the filter 110, such as by Near Detector Linearization Circuit 111 (rather than directly via conductor 74'). The outputs of circuits 100 and 110 are then passed to compensated density computation circuit 120. This circuit will typically apply a "spine-and-ribs" or similar function to the data to derive a compensated density response. The particular details of circuits 100 and 110 are crucial in ensuring that the output of circuit 120 is a compensated density which is independent of borehole rugosity. These circuits are significantly different from any previous embodiment of a density logging device.

The theory and the derivation of the specialized filters in circuits 100 and 110 are now described.

Figure 3:
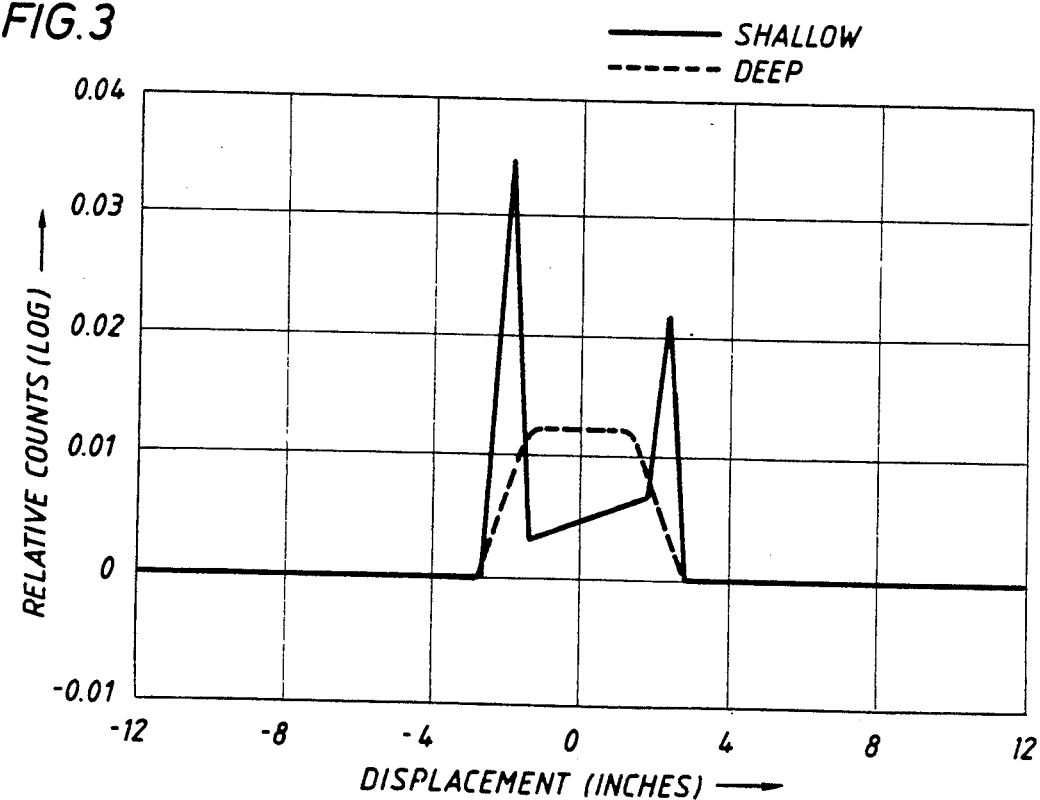
FIG. 3 is a plot of the "shallow" and "deep" vertical response functions for the near detector.
Figure 4:
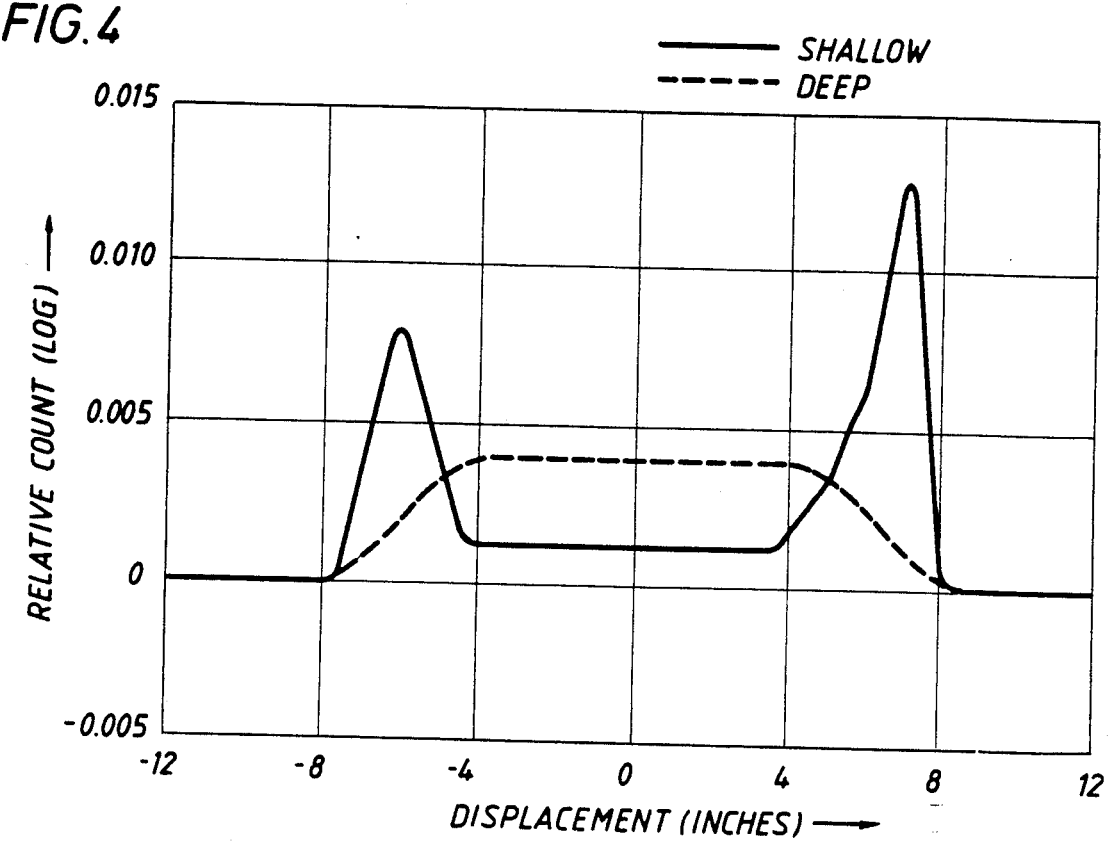
FIG. 4 is a plot of the "shallow" and "deep" vertical response functions for the far detectors.

A laboratory setup, simulating the effect of rugosity was used to study the "shallow" vertical response functions. Rugosity was simulated by inserting a special sleeve fitting tightly into a standard density calibration block, the sleeve having a density similar to that of the block. A series of narrow grooves, one half inch deep, were machined into the inside surface of the sleeve. Assignee's LITHO-DENSITY logging tool was passed inside this sleeve, and the grooves affected the response in a way similar to rugosity in a real well. In order to observe as much statistical precision and vertical detail as possible, data were acquired at twenty vertical samples per inch, with at least two seconds of data in each sample. The resulting count rates were analyzed to derive the vertical response functions of the two detectors, in a manner well known in the art. Since the formation seen by the tool in this measurement was uniform, except for the region with the grooves which was limited to the "shallow" region, the response functions derived correspond to the responses in the "shallow" region of the formation. FIG. 3 shows the two derived near detector vertical response functions. For comparison, FIG. 4 shows the corresponding far detector vertical response functions. From FIGS. 3 and 4 it can be seen that the shape of the "shallow" response functions are characterized by two sharp peaks at locations corresponding to the source and detector positions. This means that properties of the formation near the borehole wall (i.e. those dominated by mudcake or rugosity) do not affect the measurement except from vertical regions in the immediate vicinity of either the source or the detector. This can be explained by the fact that the gamma rays which ultimately reach the detector, bypass the shallow part of the formation in between the source and detector, passing through it only just after exiting the source, and just before entering the detector. Most of the path of the gamma-ray is through the deeper part of the formation.

Since the distance between these peaks in the shallow response is determined by the spacing, the near and far detectors will have very different vertical behavior in the presence of rugosity. It is this difference which causes significant perturbation to the compensated density logs in the presence of rugosity unless specialized matching filters 100, 110 are utilized. Proper matching of the two detector responses, before applying conventional compensation methods, can eliminate effects of rugosity without degrading the vertical resolution of the measurement. The accuracy of the result will be as good as that obtained in a parallel mudcake or stand-off using the conventional method.

Traditionally, the mudcake and stand-off compensation for the density measurement has been achieved by the process commonly referred to as spine-ribs. The name refers to a graphical representation of the solution to the system of two equations (the two detector readings) with two unknowns, RHOB and DRHO, where:

RHOB is the compensated bulk density and
DRHO is the density correction, in spine-ribs formulation.

All the previous embodiments of this method referred to a "static" system, where the mudcake or stand-off was parallel to the tool axis and borehole wall with a continuous homogeneous medium behind it. This represents the zero-frequency limit of the tool responses. Since the measurement of gamma-ray attenuation is a quasi-linear process, it is desired that the zero-frequency behavior can be extended to non-zero frequencies for all vertical frequencies seen by the sensors. This would only be possible if the frequency responses of the two inputs into the process were the same. Thus, we require a frequency response matching of the two detector readings.

Without loss of generality, assume that the attenuation process we measure is fully linear. The formation is divided into two regions, shallow (mudcake) and deep (true formation). The properties of the two regions ar represented by two static parameters $F_{shal}$ and $F_{deep}$ respectively. Thus we can represent the observed readings (logarithmic counts) of the short spaced (SS) and long spaced (LS) detectors in the zero-frequency limit as equations:

$$SS = a*F_{shal} + b*F_{deep} \quad (1)$$

$$LS = c*F_{shal} + d*F_{deep} \quad (2)$$

where:

a, b are coefficients describing relative magnitudes of contributions from shallow and deep regions to the SS measurement c, d are coefficients describing relative magnitudes of contributions from shallow and deep regions to the LS measurement SS, LS are SS and LS detector count rate logarithms, (or their Fourier transforms)

$F_{shal}$ is the "Shallow" formation density (or Fourier transform). This is the perturbed region.

$F_{deep}$ is the "Deep" formation density (or Fourier transform). This is the unperturbed region, and is the desired result.

These equations represent a linear approximation to the actual spine-ribs algorithm. The solution to this simple set of two equations is analogous to the spine-ribs result, where $F_{deep}$ represents RHOB and ($F_{deep}$−LS) is analogous to DRHO. To eliminate the unwanted $F_{shal}$ from the equations we multiply equation 1 by the coefficient of $F_{shal}$ in equation 2, or c, and vice versa (multiply equation 2 by a), following which we subtract one equation from the other, resulting in an equation containing $F_{deep}$ only:

$$(a*LS - c*SS) = (a*d - c*b) * F_{deep} \quad (3)$$

The value of $F_{deep}$ is obtained by simple division, providing (a*d−c*b) is non-zero, which is assured by proper tool design. (In fact, optimized tool design tends to maximize this term, which is analogous to maximizing the spine-to-rib angle).

We can extend equations 1 and 2 to other frequencies (i.e. allowing vertical variations). This means that SS, LS, $F_{shal}$ and $F_{deep}$, instead of being static (scalar) values, are arrays (vectors) of different values at each depth, and the right hand sides of the equations must include convolutions with individual response functions. For convenience, we will go to the frequency domain, where convolutions become simple products. (This means that all functions are replaced by their Fourier transforms). Again we assume that the formation can be subdivided into two regions, shallow and deep, but here we allow independent vertical variation in the two regions.

$$SS = a*S_{shal}*F_{shal} + b*S_{deep}*F_{deep} \quad (4)$$

$$LS = c*L_{shal}*F_{shal} + d*L_{deep}*F_{deep} \quad (5)$$

where $S_{shal}$ and $S_{deep}$ are the frequency domain representations of the SS detector "shallow" and "deep" response functions respectively, and $L_{shal}$ and $L_{deep}$ are those of the LS detector. Equations 4 and 5 form a linear set of equations at each frequency. The response functions $S_{shal}$ and $L_{shal}$ are the "shallow" vertical response functions while $S_{deep}$ and $L_{deep}$ are the two "deep" vertical response functions. These are the response functions shown in FIGS. 3 and 4.

Following the procedure shown in the static case, we multiply equation 4 by the coefficient of $F_{shal}$ in equation 5, or $c*L_{shal}$, and equation 5 by $a*S_{shal}$. This is, in fact, performing a cross-convolution, where the SS reading is convolved with the shallow LS response function and the LS reading is convolved with the shallow SS response function. This results in a response match of the contributions of the shallow region to both detectors, because the coefficients of $F_{shal}$ in both equations are proportional to the product $L_{shal}*S_{shal}$.

Continuing the analogy, we obtain:

$$(a*S_{shal}*LS - c*L_{shal}*SS) = (a*d*L_{deep}*S_{shal} - c*b*S_{deep}*L_{shal})*F_{deep} \quad (6)$$

which is an equation containing only one unknown, $F_{deep}$. One would think that we could solve for $F_{deep}$ by division, as before, which would be equivalent to performing simple deconvolution. Unfortunately, we can no longer guarantee that the term in brackets on the right hand side is non-zero at all frequencies. A number of techniques to avoid this problem in deconvolution are known to those skilled in the art.

For the time being let us examine the vertical behavior of the complete right side of the equation, as this will represent the vertical response of the spine-ribs result if the inputs to the spine-ribs algorithm are the cross-convolved, or filtered count rates. Note that at the first (zero) frequency, this equation reduces to the static case in equation 3.

Figure 5:
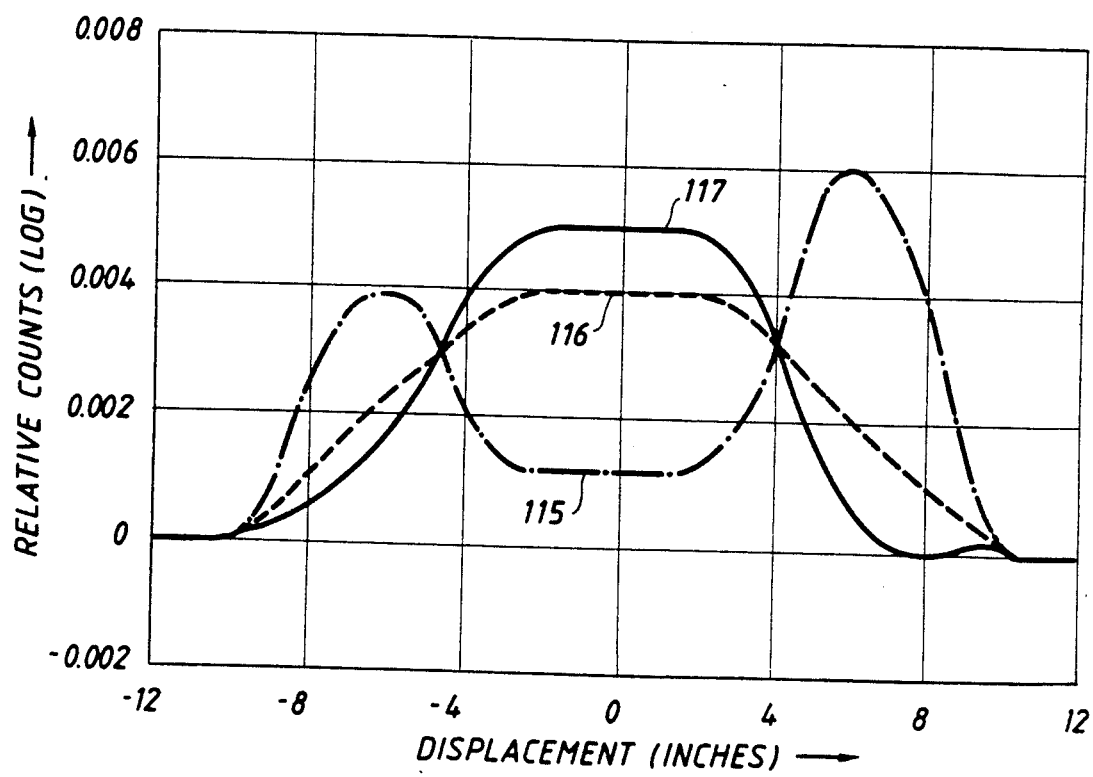
FIG. 5 is a plot of the filtered "deep" vertical response functions for the two detectors, compared to the vertical response function of the resulting compensated density.

FIG. 5 shows the comparison of the cross-convolved deep response functions for the near detector (curve 115) and the far detector (curve 116). These are given by $L_{deep}*S_{shal}$ and $S_{deep}*L_{shal}$. They appear to be quite different, but it turns out that when we pass these through the spine-ribs process, or its linear approximation (which gives the term in brackets on the right hand side of equation 6), we obtain a well behaved result which is actually narrower in vertical extent than either of the cross-convolved individual responses. This result is shown as curve 117 in FIG. 5. This response function will be representative of the compensated RHOB from spine-ribs algorithm, when cross-convolved count rates are used as inputs.

Thus, we can achieve, by this process, a compensated density log completely unaffected by the shallow region, whether with constant mudcake, or with rapidly varying rugosity, and having a vertical resolution comparable to or better than standard log results. The specialized filters referred to in the description of circuits 100 and 110 in FIG. 2, are simply the "shallow" vertical response functions of the opposite detector, i.e., the Far Detector Shallow Response Matching Circuit 100, contains the specialized filter which is identical to the Near detector "shallow" vertical response function, while circuit 110, the Near Detector Shallow Response Matching Circuit, contains the filter which is the Far detector "shallow" response function. These filters will guarantee that the outputs of circuits 100 and 110 have identical shallow vertical response functions, since they will both be described (in the frequency domain) by the product $S_{shal}*L_{shal}$. Because of the unique feature of convolving detector readings with opposite detector response functions, these specialized filters can be called "cross-convolution" filters, and the process of utilizing these filters can be called "cross-convolution".

Logging data from older wells can be reevaluated in accordance with the present method, insofar as no new logging measurements are required to obtain the enhanced compensated density of a formation. All that is required are the original output signals from the near and far detectors, which data is typically stored for older wells, and knowledge of the type of tool used to obtain the data.

It is to be understood that the invention is not limited to the exact details of construction, operation, exact materials or embodiment shown and described as obvious modifications and equivalents will be apparent to one skilled in the art. Accordingly, the invention is therefore to be limited only by the scope of the appended claims.

I claim:

1. A method for determining the compensated density of a subsurface geological formation wherein the effect of rugosity is reduced or eliminated comprising the steps of:

(a) passing a logging tool through the borehole, the logging tool having associated therewith a signal source and at least two signal sensors spaced from the signal source by different distances;

(b) transmitting a signal from the signal source into the subsurface geological formation;

(c) generating sensor signals from the at least two signal sensors in response to the signal from the signal source received by the at least two signal sensors;

(d) applying vertical filters to said generated sensor signals for matching the vertical responses of the at least two signals in the "shallow" formation region; and (e) determining a compensated density log, by combining the filtered sensor signals from step (d), wherein the contribution of the "shallow" formation region is reduced or eliminated.

2. A method for determining a formation characteristic of a subsurface geological formation wherein the effect of rugosity is reduced or eliminated comprising the steps of:
   (a) passing a logging tool through the borehole, the logging tool having associated therewith a signal source and at least two signal sensors spaced from the signal source by different distances;
   (b) transmitting a signal from the signal source into the subsurface geological formation;
   (c) generating sensor signals from the at least two signal sensors in response to the signal from the signal source received by the at least two signal sensors;
   (d) applying vertical filters to said generated sensor signals for matching the vertical responses of the at least two signals in the "shallow" formation region; and
   (e) determining a compensated formation characteristic log, by combining the filtered sensor signals from step (d), wherein the contribution of the "shallow" formation region is reduced or eliminated.

3. The method of claim 2 wherein said formation characteristic is density.

4. The method of claim 2 wherein said formation characteristic is porosity.

5. The method of claim 2 wherein said formation characteristic is resistivity.

6. The method of claim 2 wherein said logging tool is a gamma radiation bulk density tool.

7. The method of claim 2 wherein said logging tool is a porosity tool.

8. The method of claim 2 wherein said logging tool is a resistivity tool.

9. The method of claim 2 wherein said logging tool is a sonic tool.

10. The method of claim 2 wherein said logging tool is an induction logging tool.

11. A method for determining the compensated density of a subsurface geological formation wherein the effect of rugosity is reduced or eliminated comprising the steps of:
   (a) passing a logging tool through the borehole, the logging tool having associated therewith a signal source and at least two signal sensors spaced from the signal source by different distances;
   (b) transmitting a signal from the signal source into the subsurface geological formation;
   (c) generating sensor signals from the at least two signal sensors in response to the signal from the signal source received by the at least two signal sensors;
   (d) linearizing said generated sensor signals;
   (e) applying vertical filters to said linearized sensor signals for matching the vertical responses of the at least two signals in the "shallow" formation region; and
   (f) determining a compensated density log, by combining the filtered sensor signals from step (e), wherein the contribution of the "shallow" formation region is reduced or eliminated.

12. A method for determining a formation characteristic of a subsurface geological formation wherein the effect of rugosity is reduced or eliminated comprising the steps of:
   (a) passing a logging tool through the borehole, the logging tool having associated therewith a signal source and at least two signal sensors spaced from the signal source by different distances;
   (b) transmitting a signal from the signal source into the subsurface geological formation;
   (c) generating sensor signals from the at least two signal sensors in response to the signal from the signal source received by the at least two signal sensors;
   (d) linearizing said generated sensor signals;
   (e) applying vertical filters to said linearized sensor signals for matching the vertical responses of the at least two signals in the "shallow" formation region; and
   (f) determining a compensated formation characteristic log, by combining the filtered sensor signals from step (e), wherein the contribution of the "shallow" formation region is reduced or eliminated.

13. The method of claim 12 wherein said formation characteristic is density.

14. The method of claim 12 wherein said formation characteristic is porosity.

15. The method of claim 12 wherein said formation characteristic is resistivity.

16. The method of claim 12 wherein said logging tool is a gamma radiation bulk density tool.

17. The method of claim 12 wherein said logging tool is a porosity tool.

18. The method of claim 12 wherein said logging tool is a resistivity tool.

19. The method of claim 12 wherein said logging tool is a sonic tool.

20. The method of claim 12 wherein said logging tool is an induction logging tool.

21. An improved method for determining the compensated density of a subsurface geological formation wherein the effect of rugosity is and wherein data has been obtained by
   passing a logging tool through the borehole, the logging tool having associated therewith a signal source and at least two signal sensors spaced from the signal source by different distances,
   transmitting a signal from the signal source into the subsurface geological formation, and
   generating sensor signals from the at least two signals sensors in response to the signal from the signal source received by the at least two signal sensors, the improvement comprising the steps of:
   (a) applying vertical filters to said generated sensor signals for matching the vertical responses of the at least two signals in the "shallow" formation region; and
   (b) determining a compensated density log, by combining the filtered sensor signals from step (a), wherein the contribution of the "shallow" formation region is reduced or eliminated.

22. An improved method for determining a formation characteristic of a subsurface geological formation wherein the effect of rugosity is reduced or eliminated and wherein data has been obtained by
   passing a logging tool through the borehole, the logging tool having associated therewith a signal source and at least two signal sensors spaced from the signal source by different distances,
   transmitting a signal from the signal source into the subsurface geological formation, and generating sensor signals from the at least two signal sensors in response to the signal from the signal source received by the at least two signal sensors, the improvement comprising the steps of:
(a) applying vertical filters to said generated sensor signals for matching the vertical responses of the at least two signals in the "shallow" formation region; and
(b) determining a compensated formation characteristic log by combining the filtered sensor signals from step (a), wherein the contribution of the "shallow" formation region is reduced or eliminated.

23. The method of claim 22 wherein said formation characteristic is density.

24. The method of claim 22 wherein said formation characteristic is porosity.

25. The method of claim 22 wherein said formation characteristic is resistivity.

26. An improved method for determining the compensated density of a subsurface geological formation wherein the effect of rugosity is reduced or eliminated and wherein data has been obtained by
passing a logging tool through the borehole, the logging tool having associated therewith a signal source and at least two signal sensors spaced from the signal source by different distances,
transmitting a signal from the signal source into the subsurface geological formation and
generating sensor signals from the at least two signal sensors in response to the signal from the signal source received by the at least two signal sensors, the improvement comprising the steps of:
(a) linearizing said generated sensor signals;
(b) applying vertical filters to said linearized sensor signals for matching the vertical responses of the at least two signals in the "shallow" formation region; and
(c) determining a compensated density log, by combining the filtered sensor signals from step (b), wherein the contribution of the "shallow" formation region is reduced or eliminated.

27. An improved method for determining a formation characteristic of a subsurface geological formation wherein the effect of rugosity is reduced or eliminated and wherein data has been obtained by
passing a logging tool through the borehole, the logging tool having associated therewith a signal source and at least two signal sensors spaced from the signal source by different distances,
transmitting a signal from the signal source into the subsurface geological formation, and
generating sensor signals from the at least two signal sensors in response to the signal from the signal source received by the at least two signal sensors, the improvement comprising the steps of:
(a) linearizing said generated sensor signals;
(b) applying vertical filters to said linearized sensor signals for matching the vertical responses of the at least two signals in the "shallow" formation region; and
(c) determining a compensated formation characteristic log, by combining the filtered sensor signals from step (b), wherein the contribution of the "shallow" formation region is reduced or eliminated.

28. The method of claim 27 wherein said formation characteristic is density.

29. The method of claim 27 wherein said formation characteristic is porosity.

30. The method of claim 27 wherein said formation characteristic is resistivity.

* * * * *